United States Patent
Hasenpouth et al.

(10) Patent No.: US 12,428,064 B2
(45) Date of Patent: Sep. 30, 2025

(54) ROCKER REINFORCEMENT FOR AN ELECTRIC VEHICLE

(71) Applicant: ArcelorMittal, Luxembourg (LU)

(72) Inventors: Dan Hasenpouth, Paris (FR); Yohan Merdji, Valdampierre (FR); Joël Wilsius, Paris (FR)

(73) Assignee: ArcelorMittal, Luxembourg (LU)

( * ) Notice: Subject to any disclaimer, the term of this patent is extended or adjusted under 35 U.S.C. 154(b) by 387 days.

(21) Appl. No.: 17/925,667

(22) PCT Filed: May 18, 2020

(86) PCT No.: PCT/IB2020/054691
§ 371 (c)(1),
(2) Date: Nov. 16, 2022

(87) PCT Pub. No.: WO2021/234433
PCT Pub. Date: Nov. 25, 2021

(65) Prior Publication Data
US 2023/0219625 A1    Jul. 13, 2023

(51) Int. Cl.
*B62D 21/15* (2006.01)
*B60K 1/04* (2019.01)
*B62D 25/02* (2006.01)

(52) U.S. Cl.
CPC .............. *B62D 21/157* (2013.01); *B60K 1/04* (2013.01); *B62D 25/025* (2013.01)

(58) Field of Classification Search
CPC .... B62D 21/157; B62D 21/15; B62D 25/025; B62D 25/02; B60K 1/04; B60Y 2200/91; B60Y 2306/01; Y02T 10/64
USPC .............. 296/209, 187.03, 187.12
See application file for complete search history.

(56) References Cited

U.S. PATENT DOCUMENTS

| | | | |
|---|---|---|---|
| 8,308,227 B2 * | 11/2012 | Tsuruta | B62D 25/2036 296/209 |
| 9,592,867 B2 | 3/2017 | Lessmeister | |
| 10,328,978 B2 * | 6/2019 | Yang | B62D 21/157 |
| 11,560,180 B2 * | 1/2023 | Matecki | B62D 21/157 |
| 2012/0086238 A1 | 4/2012 | Tan | |

(Continued)

FOREIGN PATENT DOCUMENTS

| | | |
|---|---|---|
| DE | 102007025930 | 12/2008 |
| DE | 102011115040 | 4/2012 |

(Continued)

OTHER PUBLICATIONS

Search Report of PCT/IB2020/054691 filed Feb. 19, 2021 and International Report on Patentability.

*Primary Examiner* — Amy R Weisberg
*Assistant Examiner* — Denise Lynne Esquivel
(74) *Attorney, Agent, or Firm* — Davidson Kappel LLC

(57) ABSTRACT

Reinforced rocker assembly having a closed section reinforcement located in the hollow volume formed between the rocker components, wherein the reinforcement is assembled to a rocker component in the transition zones between an upper horizontal wall and an upper flange of the rocker component and in the transition zones between a lower horizontal wall and a lower flange of the rocker component and wherein in the transition zones, the angles α and β formed between the flange and the branch of the reinforcement extending outwards of the rocker component are between 90° and 180°.

19 Claims, 9 Drawing Sheets

(56) References Cited

U.S. PATENT DOCUMENTS

| | | | | |
|---|---|---|---|---|
| 2013/0140854 A1* | 6/2013 | Mori | ................... | B62D 25/025 |
| | | | | 296/209 |
| 2016/0068196 A1 | 3/2016 | Saeki et al. | | |
| 2019/0217898 A1* | 7/2019 | Tchepikov | ........... | B62D 29/007 |

FOREIGN PATENT DOCUMENTS

| EP | 0331945 A2 * | 2/1989 | ............. B62D 25/00 |
|---|---|---|---|
| EP | 2014539 A1 * | 1/2009 | ........... B62D 21/157 |
| JP | 2006264476 A | 10/2006 | |
| JP | 2010143476 A * | 7/2010 | |
| JP | 2015110959 A | 6/2015 | |
| WO | WO2020053799 | 3/2020 | |

\* cited by examiner

ROCKER REINFORCEMENT FOR AN ELECTRIC VEHICLE

The present invention relates to a rocker reinforcement for an electric vehicle.

BACKGROUND

The environmental concerns and regulations associated with the increase of carbon dioxide levels in the atmosphere and with local air pollution levels is pushing for the rise of electrically powered automotive vehicles. Compared to traditional internal combustion engine vehicles, electric vehicles have smaller engines, no fuel tank and no exhaust system. On the other hand, electric vehicles have a sizeable battery pack, which is not present in internal combustion engines.

There is a big battery pack that needs to be protected in the case of an electric vehicle. On a same platform several types of vehicles can be produced, including traditional Internal Combustion Engine vehicles, not having a battery pack.

SUMMARY OF THE INVENTION

It is necessary to reinforce the side structure next to the battery. One essential structural element protecting the battery pack, in particular in the case of side impacts is the rocker assembly. Said rocker assembly consists of an inner and outer rocker each of them essentially U-shaped with an upper and lower flange which are assembled together to form a closed cross section delimiting a hollow volume extending alongside the bottom of the vehicle.

In order to reinforce the rocker assembly, one possibility is to include inside the hollow volume of the rocker assembly one or several reinforcements. Such reinforcements can either have an open or a closed cross section.

An open cross section reinforcement can easily be assembled by welding or mechanical assembly to the flanges and to the vertical walls of the rocker inner and outer. Such welding process will integrate itself naturally in the assembly sequence of the vehicle, since there is in any case, even in the absence of a reinforcement element, a welding step to secure together the lower and upper flanges of the inner and outer rocker panels.

On the other hand, a closed cross section reinforcement will generally exhibit a better resistance to the compressive loads resulting from an impact and will also have a better stiffness performance. However, such closed cross section reinforcements cannot structurally contain surfaces enabling to easily assemble them on the flanges of the rocker inner and rocker outer. Furthermore, to maximize the strengthening effect, it is interesting to design a reinforcement having a cross section which occupies the biggest possible space within the hollow volume of the rocker assembly.

Such a configuration whereby a closed cross section reinforcement element occupies a large space within the rocker assembly poses the problem of efficiently assembling the reinforcement to the rocker inner and/or outer. One problem is the accessibility of assembly tools, such as for example weld tools. Another problem are the geometrical tolerances needed to secure a good assembly: the rocker inner and outer as well as the reinforcement are made out of high strength material, such as steel and they are large parts, covering the full length of the passenger cabin of the vehicle. Well known problems of springback for example entail that the dimensional tolerances of the parts before assembly will make it difficult to secure them all together. A further problem is the mechanical efficiency of the rocker assembly and the reinforcement. Indeed, one simple problem to the above stated issues of assembly tools accessibility and geometrical tolerances is to secure the reinforcement to the rocker inner and/or outer only at the front and rear extremities of the assembly, which are easily accessible. However, when so doing, the reinforcement and the rocker inner and outer will not cooperate in an optimal way in case of impact. For example, in the case of a pole impact, which is a very local solicitation of the assembly, the penetration of the pole will successively bend the rocker outer, the reinforcement and the rocker inner. Because the reinforcement is not attached to the rocker inner and outer along the length of the vehicle, the bent part of the reinforcement is not refrained from bending by the surrounding parts of the rocker inner and outer. As a consequence, the penetration of the pole will thus be higher than if the reinforcement was secured to the rocker inner and outer along the length of the vehicle and the ensuing penetration of the pole into the battery pack will be higher, possibly leading to damage of the battery itself.

One of the aims of the current invention is to overcome these challenges by providing a rocker assembly having a closed cross section reinforcement occupying a large space of the hollow volume formed by the rocker assembly.

To this end the present invention relates to a reinforced rocker assembly having a closed section reinforcement located in the hollow volume formed between the rocker components, wherein the reinforcement is assembled to a rocker component in the transition zones between an upper horizontal wall and an upper flange of said rocker component and in the transition zones between a lower horizontal wall and a lower flange of said rocker component and wherein in said transition zones, the angles $\alpha$ and $\beta$ formed between the flange and the branch of the reinforcement extending outwards of the rocker component are comprised between 90° and 180°.

By applying the above described invention, it is possible to form a rocker assembly having a closed section reinforcement which spans the entire vertical space available within the hollow volume and which can be assembled to a rocker component along the entire length of the assembly in a continuous or semi-continuous assembly. The resulting rocker assembly has optimized mechanical resistance in the case of side impact thanks to the excellent mechanical resistance of closed section reinforcements, to the maximum use of available space for such a reinforcement and to the good cooperation between at least the rocker component to which it is assembled and the reinforcement.

According to other optional features of the rocker assembly according to the invention, considered alone or according to any possible technical combination:

- The rocker component to which the reinforcement is assembled is the rocker inner.
- The rocker component to which the reinforcement is assembled is the rocker outer.
- The reinforcement is made of one single part.
- The reinforcement is made of at least two different parts which are assembled together to form the reinforcement.
- The reinforcement is assembled by welding using a filler wire technology.
- The reinforcement is assembled by MAG welding.
- The reinforcement is assembled using a discontinuous assembly joint in the form of stitches.
- The stitches are aligned between the upper and lower transition zones.

The stitches are offset between the upper and lower transition zones.

The reinforcement is further assembled to the rocker inner's vertical wall.

The reinforcement is further assembled to the rocker outer's vertical wall.

For any given transverse cross-section, the closed section of the reinforcement occupies a surface area at least greater than 80% of the total surface area defined by the hollow volume between the rocker inner and rocker outer.

For any given transverse cross-section, the maximum dimension of the reinforcement in the elevation direction is at least 75% of the maximum dimension in the elevation direction of the hollow volume and the maximum dimension of the reinforcement in the transverse direction is at least 75% of the maximum dimension in the transverse direction of the hollow volume.

The present invention further concerns a method for producing a rocker assembly as described above, comprising the steps of:

providing a rocker component positioning a closed section reinforcement relative to said rocker component in a pre-assembly position securing the closed section reinforcement to the rocker component by attaching it at least in the transition zones between the upper flange and the upper horizontal wall of the rocker component and in the transition zones between the lower flange and the lower horizontal wall of the rocker component securing the thus assembled rocker component and reinforcement to the remaining rocker component so as to form a reinforced rocker assembly.

Thanks to the above described specific shape and configuration of the assembly points between the transition zones of the rocker component and the reinforcement element, the assembly tools necessary to secure the reinforcement to the rocker component will have enough space to access the assembly point.

One of the advantages of the above described process is the flexibility afforded by the fact that the assembly of the closed section reinforcement does not modify the basic assembly process between the inner and outer rocker. This means that the same rocker inner and outer assembly process can be performed regardless of the presence of a reinforcement. Thanks to this flexibility, vehicles with and without reinforcements can be produced on the same manufacturing line. For example, a vehicle platform including an internal combustion engine vehicle and a battery electric vehicle can be assembled on the same platform, the first one devoid of a battery pack will not need a reinforcement in the rocker assembly, whereas the second will benefit from the extra battery pack protection afforded by a reinforced rocker assembly.

Optionally, the reinforcement and the rocker component are assembled using a filler wire welding technology.

Optionally, the reinforcement and the rocker component are assembled using MAG welding.

Optionally, the above described assembly process can further comprise the steps of:

assembling the rocker inner vertical wall to the reinforcement.

assembling the rocker outer vertical wall to the reinforcement.

BRIEF DESCRIPTION OF THE DRAWINGS

Other aspects and advantages of the invention will appear upon reading the following description, given by way of example, and made in reference to the appended drawings, wherein.

DETAILED DESCRIPTION

In the following description, the terms "upper", "lower", "front", "rear", "transverse" and "longitudinal" are defined according to the usual directions of a mounted vehicle. More particularly, the terms "upper" and "lower", are defined according to the elevation direction of the vehicle (or Z direction of FIG. 2), the terms "front", "rear" and "longitudinal" are defined according to the front/rear direction of the vehicle (or L direction of FIG. 2) and the term "transverse" is defined according to the width of the vehicle.

Figure 1:
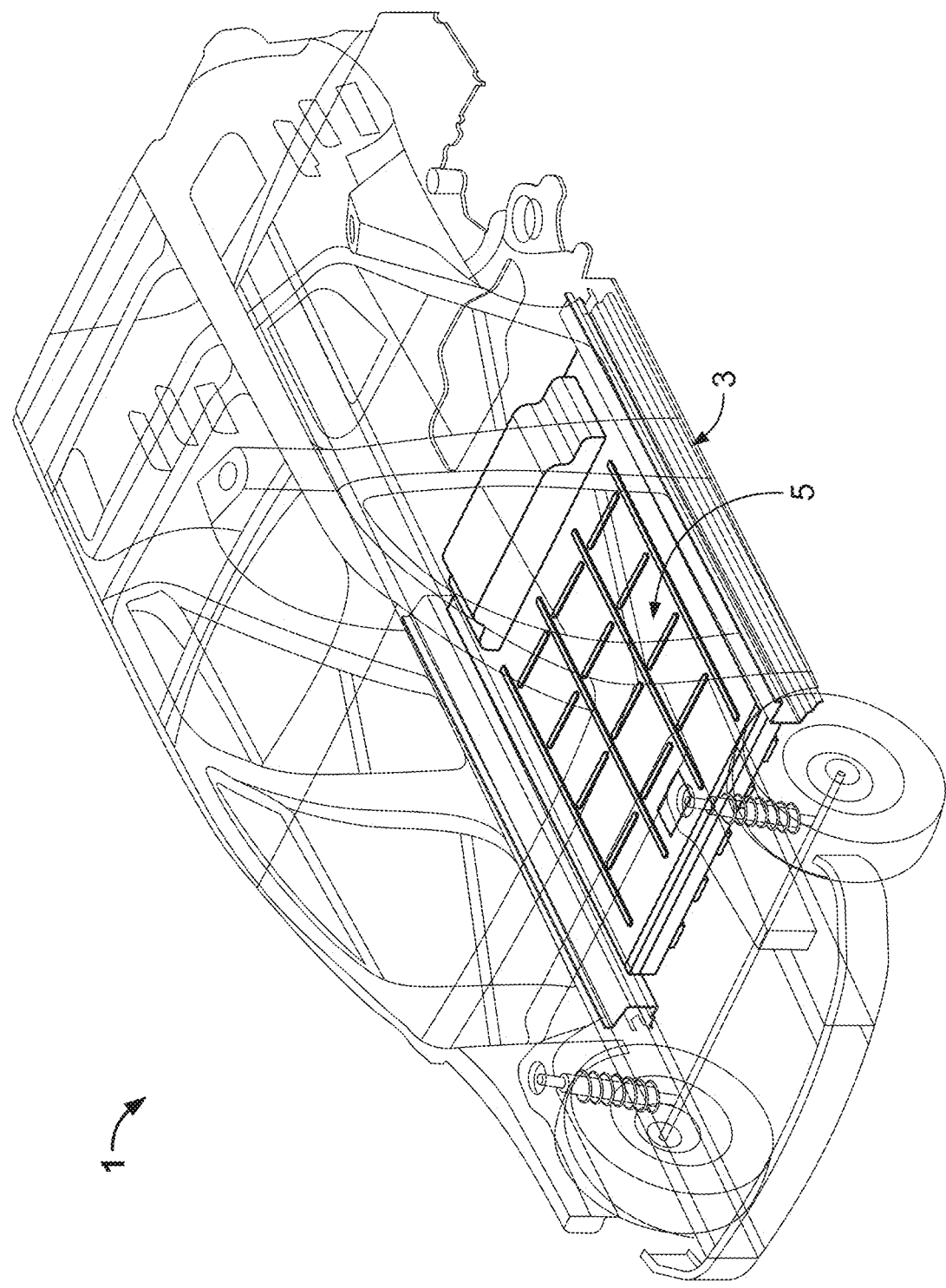
FIG. 1 is an overall perspective view of a vehicle according to the invention
Figure 2:
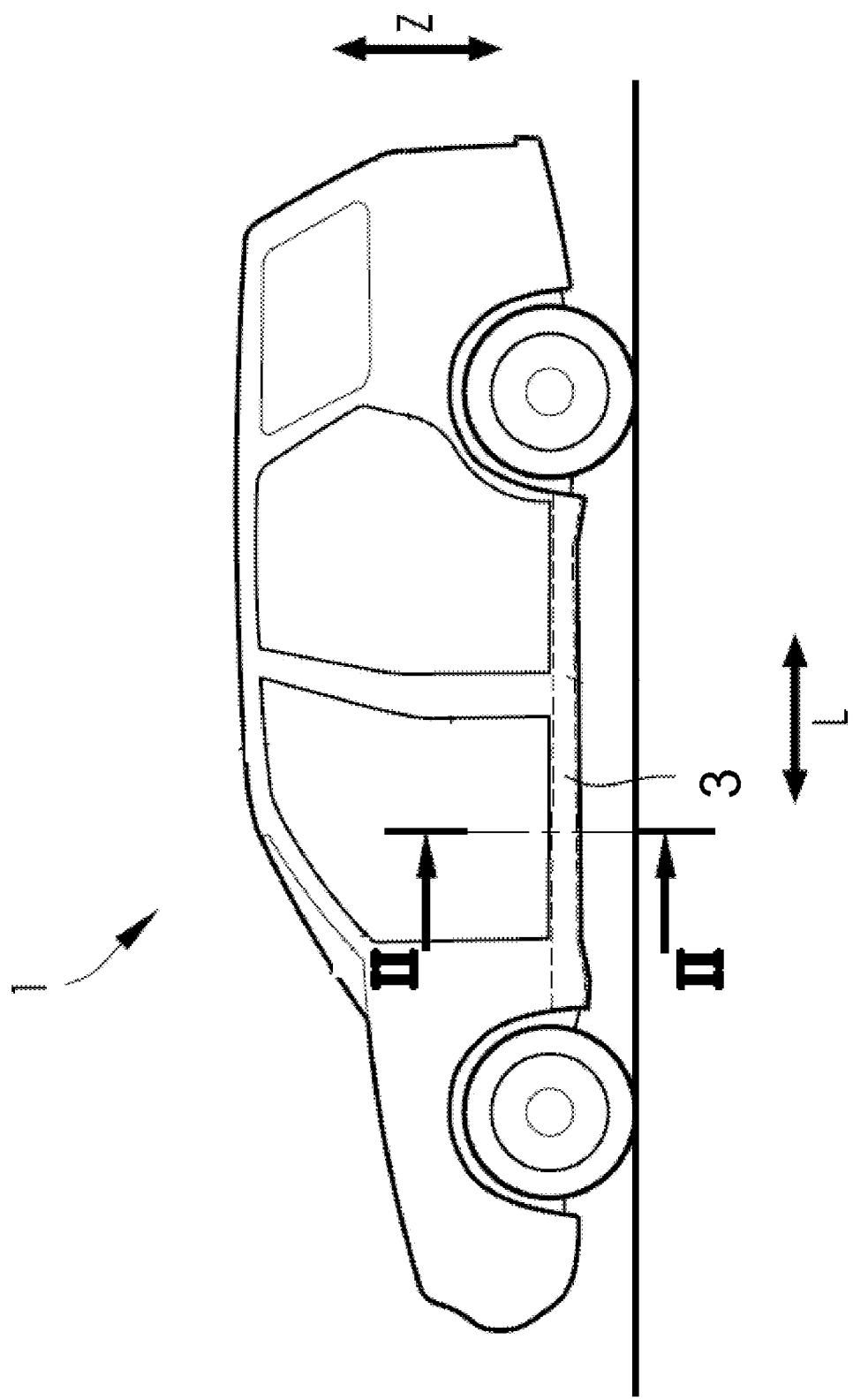
FIG. 2 is a side view of a vehicle according to the invention

Referring to FIGS. 1 and 2, a reinforced rocker assembly 3 for an electric or hybrid vehicle 1 (herein after referred to simply as a vehicle) having a battery pack 5 located under the floor panel is described. The reinforced rocker assembly 3 forms part of the side structure of the vehicle. It spans the passenger cabin of the vehicle extending in the longitudinal direction. It can be either a standalone assembly, as will be described in the following embodiments, or integrated into larger parts, such as for example a door ring inner and outer each made of a single part stamped from a tailor welded blank.

The side structure of the vehicle is designed to protect the vehicle occupants in case of a side impact. Such a side impact is described in various standardized crash tests such as for example the European New Car Assessment Program (EuroNCAP) Pole Side Impact, in which the vehicle is impacted on its side by a fixed pole having a relative initial velocity at the time of impact of 32 km/h. Another standardized side impact test is the EuroNCAP Advanced European Mobile Deformable Barrier (AE-MDB) Side Impact, in which the vehicle is impacted on its side by a 1400 kg standardized barrier spanning part of the length of the vehicle and travelling at a speed of 60 km/h.

In the case of a vehicle 1 having a battery pack 5 located under the floor panel, the side structure further has the function of protecting the battery pack 5 from being damaged. Because the reinforced rocker assembly 3 is located at the same elevation as said battery pack 5, it will be directly involved in protecting the battery pack.

Figure 3:
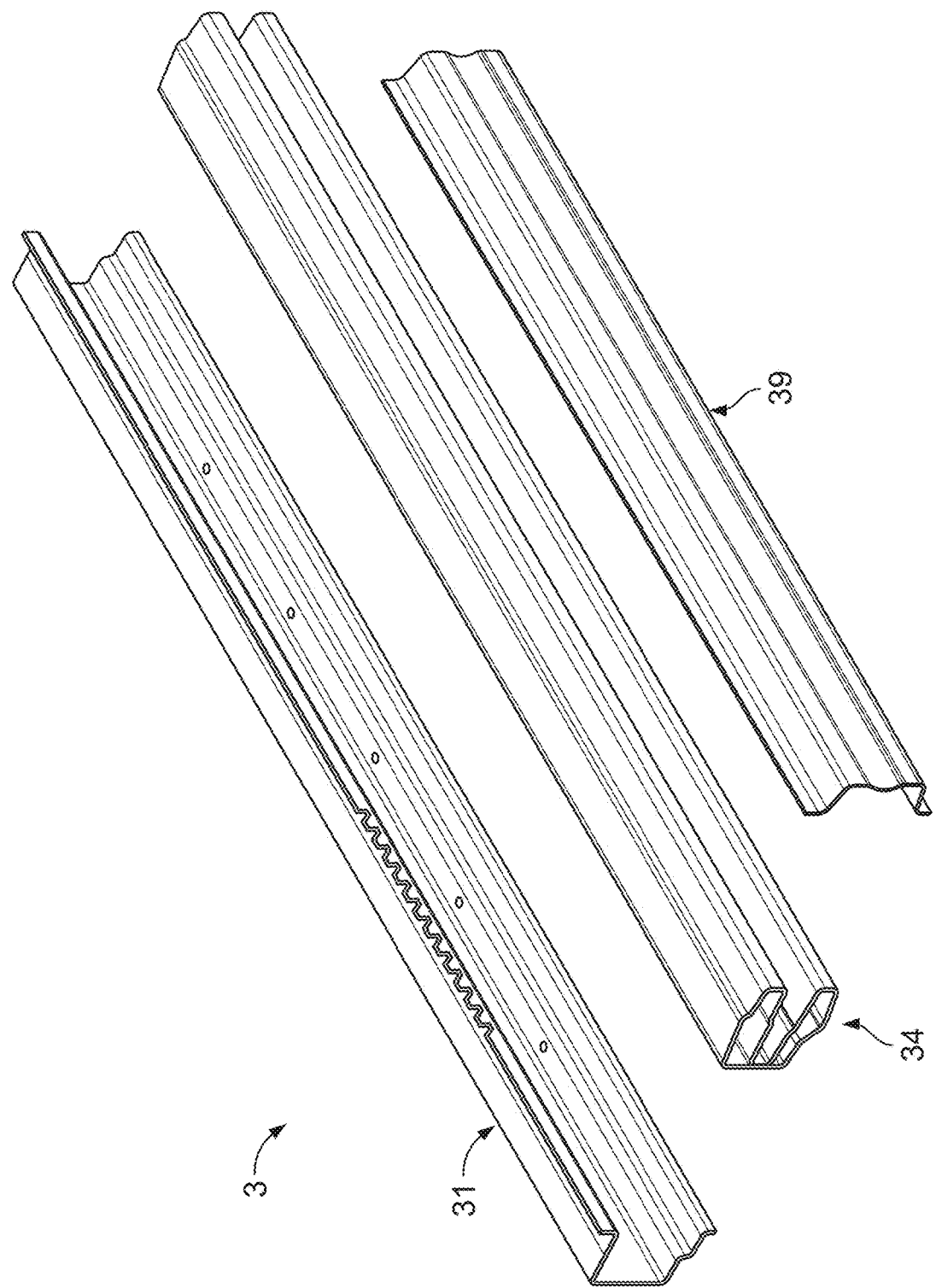
FIG. 3 is an exploded view of the reinforced rocker assembly according to an embodiment of the current invention
Figure 9:
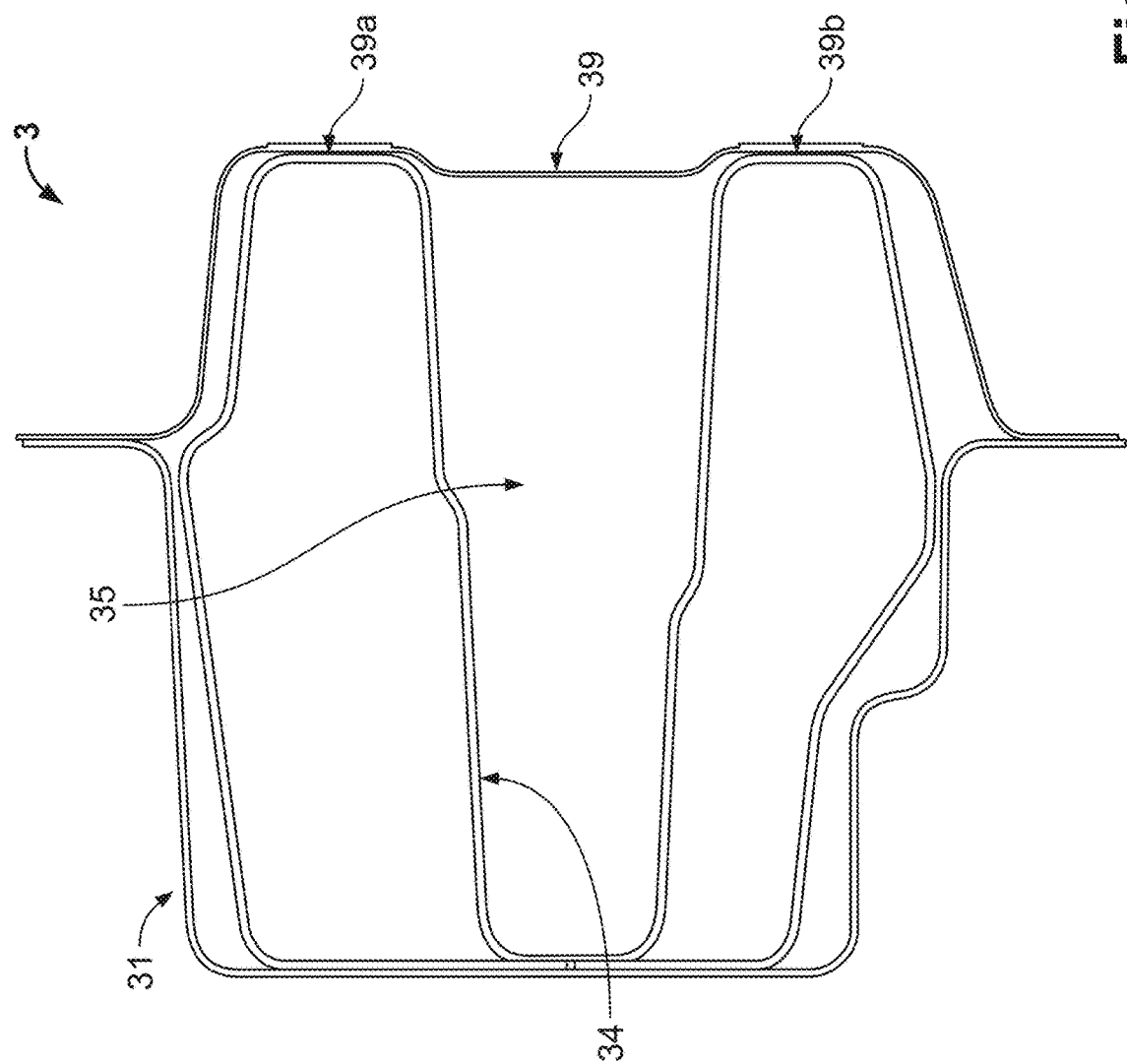
FIG. 9 is a transverse cross section according to axis II-II of FIG. 2 of a reinforced rocker assembly according to an embodiment of the current invention

Referring to FIGS. 3 and 9, the reinforced rocker assembly 3 is composed of two rocker components 31, 39 forming a hollow volume 35 when assembled together (see FIG. 9). The rocker component 31 located closer to the inside of the vehicle is referred to as the rocker inner 31. The rocker component 39 located closer to the outside of the vehicle is referred to as the rocker outer 39. The reinforced rocker assembly 3 is reinforced by a closed section reinforcement 34 occupying the hollow volume 35.

It should be understood that the hollow volume 35 depicts the volume comprised between the rocker components 31, 39. This volume does not comprise the assembly points between the rocker components 31, 39. For example, this volume does not comprise the assembly points at the flanges. Indeed, the flanges are assembled flat onto one another and do not therefore include a significant volume in between each other.

For the sake of clarity, the invention will hereafter be described using the rocker inner 31 as the rocker component to which the closed section reinforcement will be attached. However, it should be noted that the invention is fully symmetrical between the rocker inner 31 and rocker outer 39, which both have a generally U-shaped cross-section with upper and lower flanges and both have the same function of forming together a hollow volume 35 and which both have the function of resisting side impacts individually and synergistically when assembled to form a reinforced rocker assembly 3.

Figure 4:
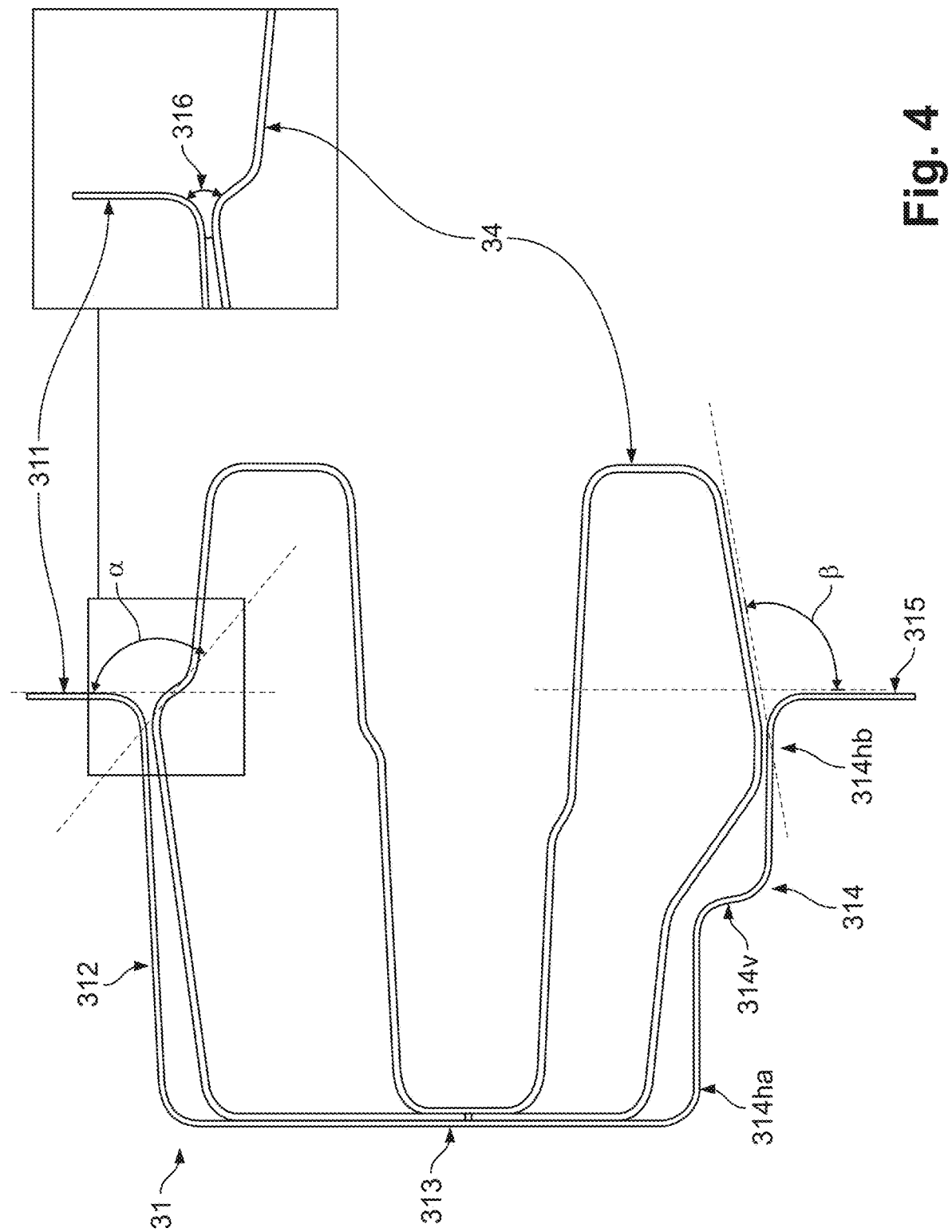
FIGS. 4, 5, and 6 are transverse cross sections according to axis II-II of FIG. 2 of a rocker component and a reinforcement according to different embodiments of the current invention

Referring to FIG. 4, the rocker inner 31 has a generally U-shaped cross-section comprising an upper horizontal wall 312, a lower horizontal wall 314, linked together by a vertical wall 313. It should be noted that said walls 312, 313 and 314 are not necessarily strictly straight and can comprise different sections as is the case for example of the lower wall 314 of FIG. 4, which comprises two horizontal sections 314ha and 314hb linked by a vertical section 314v. Such a design can be advantageous either to accommodate for the presence of other parts, or to rigidify the part and make it more resistant to buckling. In FIG. 4, the lower wall 314 comprises several sections, however this is a particular embodiment which is not limitative. The other walls 312 and 313 can also comprise several such sections, according to the constraints and design choices made for the specific application.

An upper and lower flange 311 and 315 extend respectively from the upper and lower horizontal walls 312 and 314. Said flanges are designed to assemble the rocker inner 31 to facing flanges of the rocker outer 39, for example by spot welding them together in several areas along their length. The assembled configuration of the reinforced rocker assembly is depicted on FIG. 9, on which the assembled facing flanges of the two rocker components 31, 39 can be clearly seen.

Referring to FIG. 9, the closed section reinforcement 34, hereafter referred to simply as the reinforcement 34, occupies a portion of the volume of the hollow volume 35.

FIG. 4 depicts the rocker inner 31 and the reinforcement 34 in their assembled position, before the reinforced rocker assembly 3 is fully formed by further assembling the rocker outer 39 by securing the flanges of the rocker inner and outer together. The reinforcement occupies part of the volume comprised within the walls 312, 313 and 314 and extends outwards from this limited volume.

The reinforcement 34 is assembled to the rocker inner 31 in the transition zone between the upper flange 311 and the upper horizontal wall 312 and in the transition zone between the lower flange 315 and the lower horizontal wall 314.

Referring to FIG. 4, in order to make it possible for an assembly tool to access the assembly area in the transition zones, the angles α and β defined by the flange 311, 315 and the branch of the reinforcement 34 extending outwards of the rocker inner is at least 90°. Indeed, if one of said angles α or β is lower than 90°, the access area in which the assembly tool will need to perform the assembly will be very narrow, which will require to implement specific measures and use specific tooling to perform the assembly. This will have a negative impact on assembly costs and productivity. It is even possible that the access area would be too narrow for any existing or conceivable assembly tool, rendering the assembly virtually impossible. It is also one of the characteristics of the present invention to limit the angles α and β to a maximum value of 180°. Indeed, if the angle is above 180°, the relative positioning of the outward extending branch of the reinforcement 34 and the flange 311 or 315 will make it difficult if not industrially impossible to assemble them because they will not be easily resting upon one another after assembly.

To further illustrate the assembly between the rocker inner 31 and the reinforcement 34 in the upper transition zone between the upper wall 312 and the upper flange 311, a zoom on the assembly area is provided in FIG. 4. The joint 316 formed by the assembly tool is materialized to better understand the invention. It should be understood that the specific shape and appearance of the depicted joint 316 is an illustration for explanation purposes and does not limit the scope of the invention.

In a particular embodiment, the assembly technology to produce the joint 316 is a welding operation involving a filler wire such as a MAG or MIG welding process, which uses a wire to secure the parts together. Another type of filler wire welding technology can be the use of a welding head comprising a laser beam melting a filler wire.

Advantageously, by using a filler wire welding technology, it is possible to bridge the gap that may exist between the rocker inner 31 and the reinforcement 34 in the above described assembly areas. In an industrial situation such a gap will frequently occur, especially when using very high strength steels which are subject to springback issues, making it impossible to reach very low geometrical tolerances on industrial parts. Advantageously, applying a filler wire welding process will ensure industrial robustness and reproducibility of the assembly process over a large range of geometrical tolerances. It should also be noted that the described design of the assembly area between the rocker inner 31 and the reinforcement 34 is particularly advantageous for application of filler wire welding technologies because it provides an assembly configuration which can be designed to provide an open space around the joint 316 towards the inside of the volume defined by the walls 312, 313 and 314 of the rocker inner. This in turn provides plenty of space for the vapors resulting from the welding operation to escape the joint 316, thereby minimizing the risk of bubble entrapment within the joint 306. Entrapped bubbles weaken the weld joint and are a well-known problem in filler wire welding, especially when applied to parts which are zinc coated, because of the low boiling point of Zinc.

Figure 7:
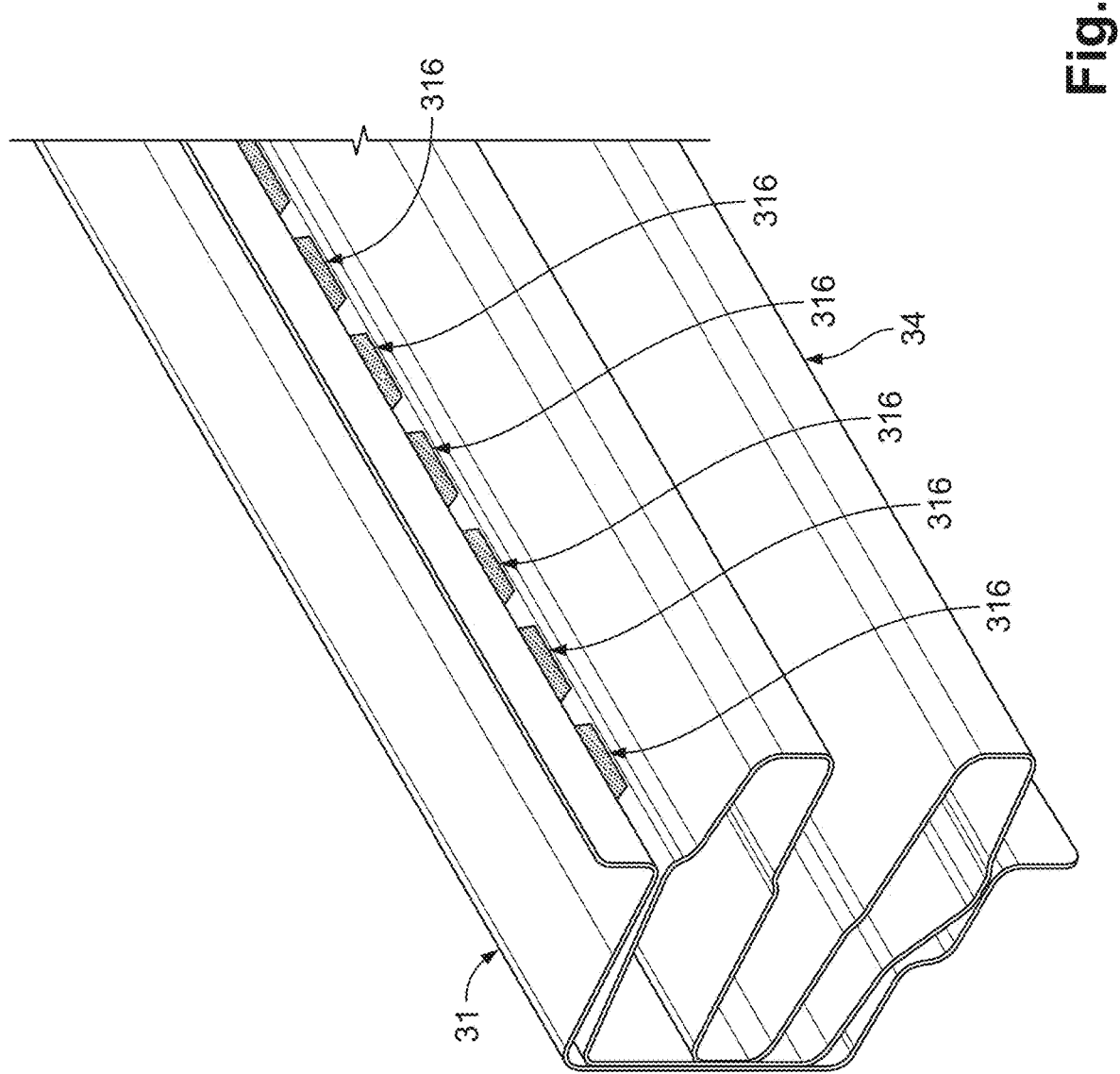
FIG. 7 is a perspective view of a rocker component and a reinforcement according to an embodiment of the current invention
Figure 8A:
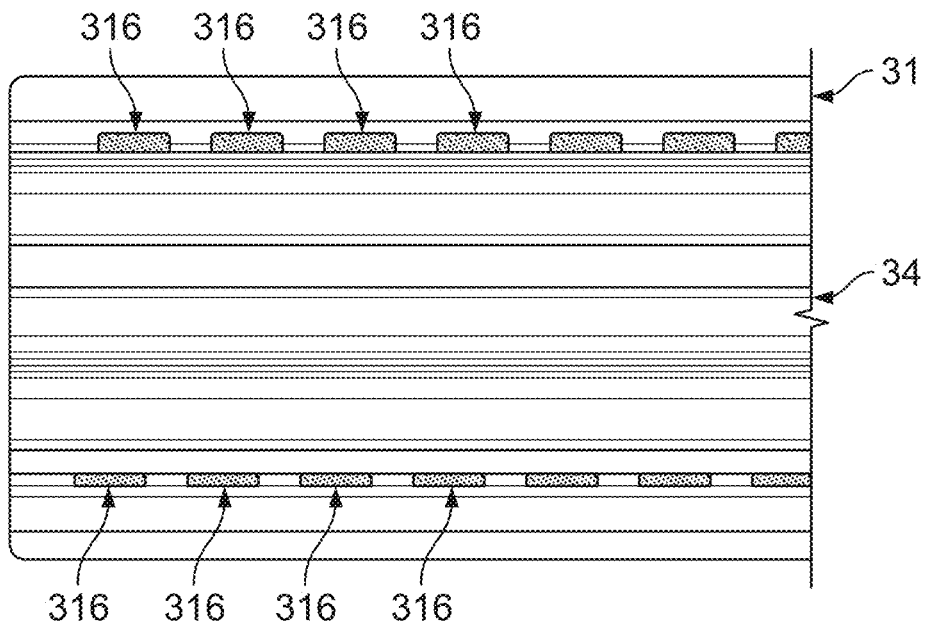
FIGS. 8a and 8b are side views of a rocker component and a reinforcement according to different embodiments of the current invention
Figure 8B:
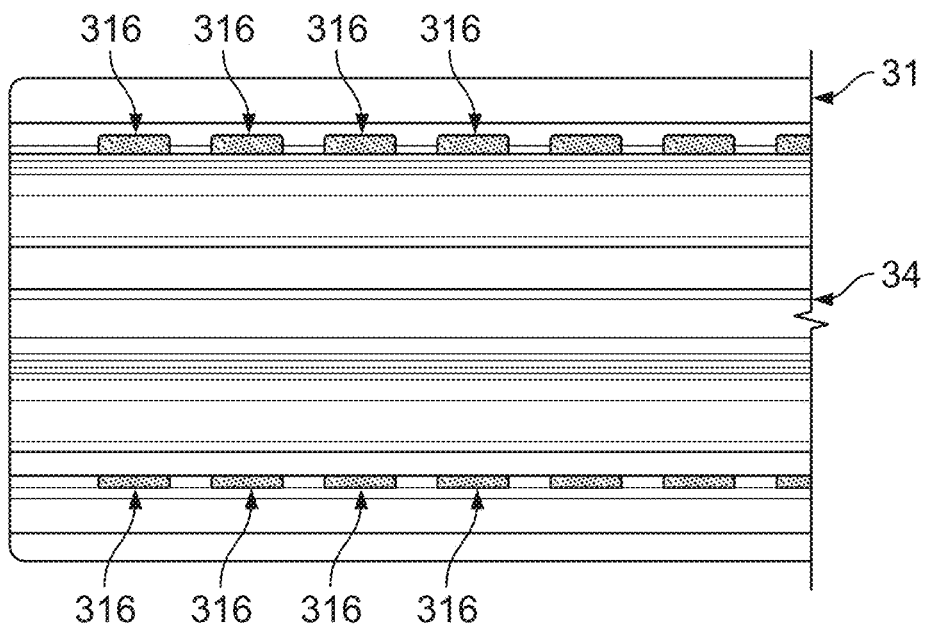

In a specific embodiment, depicted on FIG. 7, FIGS. 8a and 8b, the assembly joint 316 between the rocker inner 31 and the reinforcement 34 is not continuous along the length of the parts in the longitudinal direction. It consists instead of discontinuous stitches distributed along the longitudinal direction. Advantageously, securing the parts using discontinuous stitches will lower the assembly time, lower the wear on the assembly tools and the consumption of filler wire when a filler wire welding technology is used. It will also lower the overall weight of the assembly thanks to the lower amount of melted filler wire incorporated into the part. It will also lower the amount of heat affected zone which can induce weaknesses in the assembled parts. It will also lessen the risk of thermal distortions of the parts induced by the heat input of the welding process, providing a final assembly with better geometrical tolerances. Furthermore, when filler wire welding is used, stitch welding will also diminish the risk of bubble formation in the weld joint because the metal vapors resulting from the welding operation will have a further chance to escape on the sides of the stitches. Finally, even though the assembly joint between the rocker inner 31 and the reinforcement is not continuous, the fact that the stitches are present along a large area of the length of the parts still ensures a very good mechanical cooperation between the parts in the case of a side impact.

The above described stitches forming the assembly joint 316 can be either aligned between the stitches on the upper transition zone and the lower transition zone, as depicted on FIG. 8b or can be offset in the longitudinal direction as depicted on FIG. 8a. Advantageously, using an offset configuration can help mitigate the thermal distortion effect brought on by the heat input of the welding operation.

In a particular embodiment, the reinforcement 34 can be further assembled to the rocker inner 31 in another areas that the transitions zones, for example by securing the reinforcement 34 to the vertical wall 313 using adhesive bonding. For example, the adhesive can be applied prior to positioning the reinforcement 34 inside the rocker inner 31. The adhesive can be applied on the outside of the closed cross section of the reinforcement 34 or on the vertical wall 313 or on both surfaces. Advantageously, further securing the reinforcement 34 to the rocker inner 31 as described will further strengthen the bond between the two parts, thereby increasing their positive collaboration in case of a side impact. Furthermore, this step of securing the reinforcement 34 to the rocker inner 31 in other areas than the transition zones can be performed prior to the above described step of assembling both parts in the transition zones. Advantageously, by doing so, it is possible to keep both parts firmly secured respectively to one another, so that they will not move during the step of assembling them in the transition zones.

Figure 5:
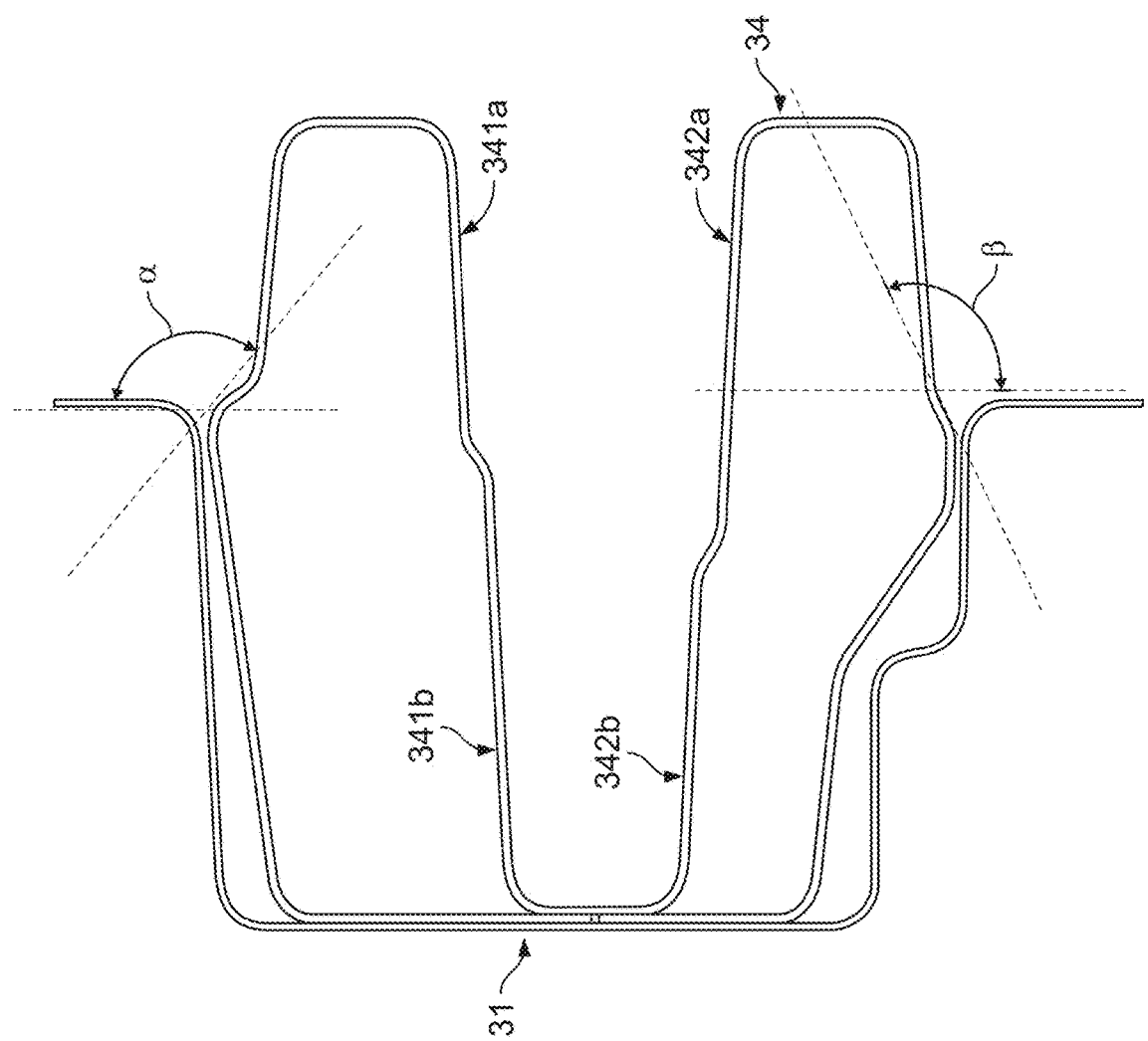
Figure 6:
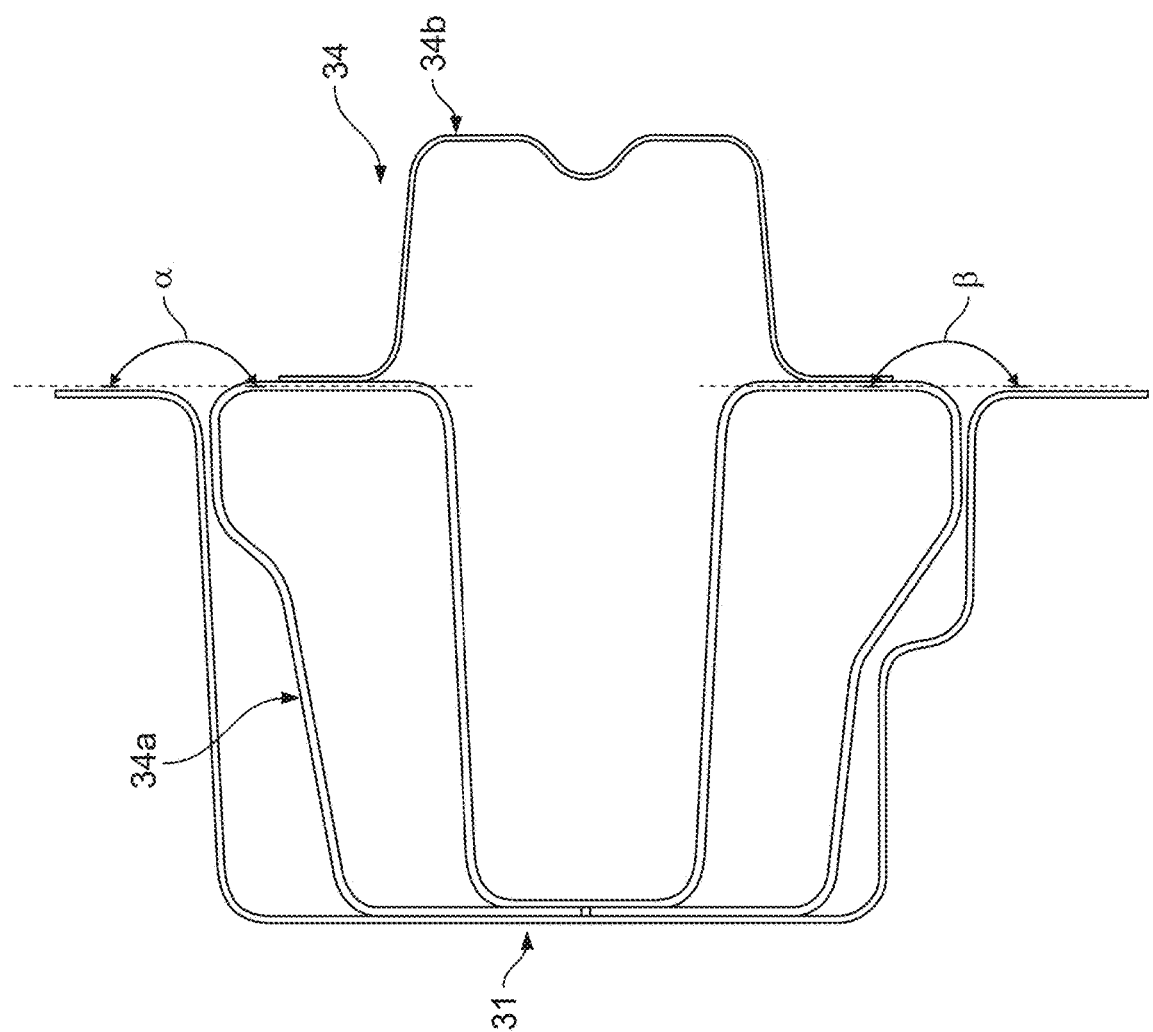

FIGS. 4, 5 and 6 show several different possible embodiments of the reinforcement 34. The reinforcements 34 of FIGS. 4 and 5 are both made of one single part, which can be manufactured for example by a roll forming operation followed by a welding operation to keep the cross section closed. The reinforcement of FIG. 5 differs from that of FIG. 4 in that there is a geometrical alteration of the wall extending outwards from the rocker inner 31 in the lower transition zone, which is not present in the reinforcement of FIG. 4 (the wall of the reinforcement extending outwards from the rocker inner in the lower transition zone is straight in FIG. 4). The effect of such a geometrical feature is to increase the angle β and therefore to leave more room for the assembly tool to access the assembly area in order to produce an assembly joint 316 in the lower transition zone.

The reinforcements 34 depicted on FIGS. 4 and 5 also exhibit specific features to make it more resistant to the compression load induced by a side impact. Indeed, the inner horizontal walls of said reinforcements extend in two separate planes depicted on FIG. 5: the upper inner horizontal wall extends along the planes 341a and 341b, the lower inner horizontal wall extends along the planes 342a and 342b. By providing such a reinforcement 34 with horizontal walls extending over at least two different planes, it is possible to design a reinforcement 34 having a higher resistance to compression loads and in particular a better resistance to buckling under compression loads.

The reinforcement 34 depicted on FIG. 6 is made of two separate parts, the inner reinforcement 34a and the outer reinforcement 34b, which are assembled together, for example by MAG welding or laser welding, to form the reinforcement 34. The inner reinforcement 34a is made for example by roll forming and welding. The outer reinforcement 34b is made for example by cold stamping or hot stamping. By providing a reinforcement 34 made of several different parts assembled together, it is possible to optimize the use of material in the different parts of the reinforcement 34. It is also possible to design a reinforcement 34 having a shape that could not be attained using only a single part. In the case of a reinforcement made out of at least two different parts assembled together, the geometrical tolerances of the assembly will be a compound of the geometrical tolerances of the different sub parts composing the reinforcement 34. As was already mentioned, the use of high strength steels with their associated springback issue can induce high geometrical tolerances, and this effect is increased in the case of compound geometrical tolerances for a reinforcement 34 comprising several sub-parts. It is in this case even more advantageous to apply a filler wire welding technology as was previously described in order to accommodate for the distribution of geometrical tolerances which will be encountered in an industrial mass production setup.

In general, the invention can be applied using any shape of closed section reinforcement 34 providing that the angles α and β are comprised in the range of 90° to 180°. The shape, material and thickness of the reinforcement 34 will be tailored by the designers to meet the specific constraints associated with fitting it in the hollow volume 35 and the specific requirements associated with side impact and possibly other requirements such as body rigidity, front impact, rear impact etc. Other constraints to take into account include manufacturing costs and part weight among others.

Once the rocker inner 31 and the reinforcement 34 have been secured together, the rocker outer 39 is secured to the rocker inner 31 in their respective flange areas in order to form the reinforced rocker assembly 3. As was previously indicated, assembling the reinforcement 34 to the rocker inner 31 and then assembling this sub-assembly to the rocker outer 39 is one possible embodiment, that was described in more detail for the sake of simplicity. However, the invention can also be applied by first assembling the reinforcement 34 to the rocker outer 39 and then securing this sub-assembly to the rocker inner 31, both rocker components 31 and 39 playing symmetrical roles.

As was previously described regarding the specific embodiment wherein the reinforcement 34 and the rocker inner 31 are further assembled in other areas than the transition zones, for example in the area of the vertical wall 313, it is also possible in a specific embodiment to secure the reinforcement 34 to the rocker outer 39, for example along the vertical wall of the rocker outer 39. For example, in the specific embodiment of FIG. 9, it is possible to secure the reinforcement 34 to the rocker outer 39 in the areas 39a and 39b, where both parts are in contact with each other. This can be done for example by adhesive bonding. The adhesive can be for example applied on the reinforcement 34 or on the rocker outer 39 or on both parts. Advantageously, this will further increase the bond between the reinforcement 34 and the rocker outer 39, thereby further promoting cooperation of the parts under the compressive loads of a side impact for example.

The above described reinforced rocker assembly 3 is well suited to protect a battery pack 5 in the case of a side impact. For example, in the case of a pole impact, which is a very local solicitation of the assembly, the penetration of the pole will successively bend the rocker outer, the reinforcement and the rocker inner. Because the reinforcement is well attached to at least one of the rocker components 31, 39 over a large length of the part in the longitudinal direction, the bent part of the reinforcement 34 will be refrained from bending by the surrounding parts of the rocker component 31, 39 to which it is attached. As a consequence, the penetration of the pole will be lower than if the reinforcement 34 was not secured to a rocker component 31, 39 along the length of the vehicle. The ensuing penetration of the pole into the battery pack will thus be lower, thereby protecting the battery pack and battery cells. The above described reinforced rocker assembly 3 will also contribute to the protection of the occupants of the vehicle in case of a side impact. It can also play an active role in the case of front or rear impact by absorbing and transmitting the load of the impact to other structural parts of the vehicle. It can further contribute to increasing the overall rigidity of the vehicle.

In order to maximize the impact of the reinforcement 34 on the strength of the reinforced rocker assembly 3, it is advantageous to maximize the amount of space that the closed section of the reinforcement 34 occupies within the hollow volume 35. In a specific embodiment, for any given transverse cross-section, the closed section of the reinforcement 34 occupies a surface area at least greater than 80% of the total surface area defined by the hollow volume 35. In a specific embodiment, for any given transverse cross-section, the maximum dimension of the reinforcement 34 in the elevation direction is at least 75% of the maximum dimension in the elevation direction of the hollow volume 35 and the maximum dimension of the reinforcement 34 in the transverse direction is at least 75% of the maximum dimension in the transverse direction of the hollow volume 35.

In order to maximize the strength of the reinforced rocker assembly 3, it is interesting to apply very high strength steels to manufacture the rocker components 31, 39 and the reinforcement 34.

In a specific embodiment, at least one of the rocker components 31, 39 is made of a press-hardening steel having a tensile strength greater than 950 MPa. According to an embodiment, the composition of the press-hardened steel comprises in % weight: $0.06\% \leq C \leq 0.1\%$, $1\% \leq Mn \leq 2\%$, $Si \leq 0.5\%$, $Al \leq 0.1\%$, $0.02\% \leq Cr \leq 0.1\%$, $0.02\% \leq Nb \leq 0.1\%$, $0.0003\% \leq B \leq 0.01\%$, $N \leq 0.01\%$, $S \leq 0.003\%$, $P \leq 0.020\%$ less than 0.1% of Cu, Ni and Mo, the remainder being iron and unavoidable impurities resulting from the elaboration. With this composition range, the yield strength of this part is comprised between 700 and 950 MPa, the tensile strength between 950 MPa and 1200 MPa and the bending angle is above 75°. For example, this part is made of Ductibor® 1000. In a specific embodiment, at least one of the rocker components 31, 39 is made of a press-hardening steel having a tensile strength greater than 1300 MPa. According to an embodiment, the steel composition comprises for example, in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration. With this composition range, the tensile strength of at least one rocker components 31, 39 after press-hardening is comprised between 1300 and 1650 MPa. For example, at least one rocker components 31, 39 is made of Usibor® 1500.

In a specific embodiment, at least one of the rocker components 31, 39 is made of a press-hardening steel having a tensile strength greater than 1800 MPa. For example, the steel composition of the reinforced non-deformable portion 36 comprises, in % weight: $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, the remainder being iron and unavoidable impurities resulting from the elaboration With this composition range, the tensile strength of at least one rocker components 31, 39 after press-hardening is higher than 1800 MPa. For example, at least one rocker components 31, 39 is made of Usibor® 2000.

In a specific embodiment, one at least of the rocker components 31, 39 or the reinforcement 34 is made of fully martensitic steel having a tensile strength higher than 1100 MPa. For example one at least of the rocker components 31, 39 or the reinforcement 34 is made of MartiNsite® 1100.

In a specific embodiment, one at least of the rocker components 31, 39 or the reinforcement 34 is made of fully martensitic steel having a tensile strength higher than 1200 MPa. For example one at least of the rocker components 31, 39 or the reinforcement 34 is made of MartiNsite® 1200.

In a specific embodiment, one at least of the rocker components 31, 39 or the reinforcement 34 is made of fully martensitic steel having a tensile strength higher than 1300 MPa. For example one at least of the rocker components 31, 39 or the reinforcement 34 is made of MartiNsite® 1300.

In a specific embodiment, one at least of the rocker components 31, 39 or the reinforcement 34 is made of fully martensitic steel having a tensile strength higher than 1500 MPa. For example one at least of the rocker components 31, 39 or the reinforcement 34 is made of MartiNsite® 1500.

In a specific embodiment, one at least of the rocker components 31, 39 or the reinforcement 34 is made of fully martensitic steel having a tensile strength higher than 1700 MPa. For example one at least of the rocker components 31, 39 or the reinforcement 34 is made of MartiNsite® 1700.

In a specific embodiment, one at least of the rocker components 31, 39 or the reinforcement 34 is coated with a metallic coating affording corrosion protection such as a Zinc based coating.

In a specific embodiment, the thickness of the steel used to manufacture the rocker components 31, 39 and the reinforcement 34 is comprised between 1.0 mm and 2.0 mm.

The present invention further concerns a method for producing a reinforced rocker assembly 3 as described above, comprising the steps of:
  providing a first rocker assembly component 31, 39
  positioning a closed section reinforcement 34 relative to said first rocker component 31, 39 in a pre-assembly position
  securing the reinforcement 34 to said first rocker component 31, 39 by attaching it at least in the transition zones between the upper flange and the upper horizontal wall of the first rocker component 31, 39 and in the transition zones between the lower flange and the lower horizontal wall of the first rocker component 31, 39
  securing the thus obtained assembly between the first rocker component 31, 39 and the reinforcement 34 to the other rocker component 31, 39 so as to form a reinforced rocker assembly 3.

Thanks to the above described specific shape and configuration of the assembly points between the transition zone of the first rocker component 31, 39 and the reinforcement 34, the assembly tools necessary to secure the reinforcement 34 to the first rocker component 31, 39 will have enough space to access the assembly point.

One of the advantages of the above described process is the flexibility afforded by the fact that the presence of the reinforcement 34 does not modify the basic assembly process between the first rocker components 31 and 39. This means that the same basic rocker assembly process can be performed regardless of the presence of a reinforcement 34. Thanks to this flexibility, vehicles with and without reinforcements can be produced on the same manufacturing line. For example, a vehicle platform including an internal combustion engine vehicle and a battery electric vehicle can be assembled on the same platform, the first one devoid of a battery pack will not need a reinforcement in the rocker assembly, whereas the second will benefit from the extra battery pack protection afforded by a reinforced rocker assembly 3.

Optionally, the reinforcement 34 and the first rocker component 31, 39 are assembled by a filler wire welding technology.

Optionally, the reinforcement 34 and the first rocker component 31, 39 are assembled by MAG welding.

Optionally, the above described assembly between the reinforcement 34 and the first rocker component 31, 39 is performed using a discontinuous assembly joint 316, also known as stitches. Optionally the stitches in the upper transition zone and the lower transition zone are aligned with one another. Optionally the stitches in the upper transition zone and the lower transition zone are offset with one another.

Optionally, the above described assembly process can further comprise the steps of:
assembling the rocker inner vertical wall to the reinforcement.
assembling the rocker outer vertical wall to the reinforcement.

What is claimed is:

1. A rocker assembly comprising:
a first rocker component and a second rocker component and a closed section reinforcement located in a hollow volume formed between the first rocker component and the second rocker component, wherein the reinforcement is assembled to the first rocker component in assembly zones located in transition zones between an upper horizontal wall and an upper flange of the first rocker component and in transition zones between a lower horizontal wall and a lower flange of the first rocker component and wherein in the transition zones, an angle α formed between the upper flange and a first part of the reinforcement extending outwards of the assembly zone is between 90° and 180°, and an angle β formed between the lower flange and a second part of the reinforcement extending outwards of the assembly zone is between 90° and 180°, wherein the reinforcement is assembled to the first rocker component by (i) welding using a filler wire welding technology; or (ii) by MAG welding, or (iii) by using a discontinuous assembly joint in the form of stitches.

2. The rocker assembly as recited in claim 1 wherein the first rocker component is the rocker inner.

3. The rocker assembly as recited in claim 1 wherein the first rocker component is the rocker outer.

4. The rocker assembly as recited in claim 1 wherein the reinforcement is made of one single part.

5. The rocker assembly as recited in claim 1 wherein the reinforcement is made of at least two different parts assembled together to form the reinforcement.

6. The rocker assembly as recited in claim 1 wherein the reinforcement is assembled to the first rocker component by welding using a filler wire welding technology.

7. The rocker assembly as recited in claim 1 wherein the reinforcement is assembled to the first rocker component by MAG welding.

8. The rocker assembly as recited in claim 1 wherein the reinforcement is assembled to the first rocker component using a discontinuous assembly joint in the form of stitches.

9. The rocker assembly as recited in claim 8 wherein the stitches are of the upper and lower transition zones are aligned.

10. The rocker assembly as recited in claim 8 wherein the stitches are of the upper and lower transition zones are offset.

11. The rocker assembly as recited in claim 2 wherein the reinforcement is further assembled to a vertical wall of the rocker inner.

12. The rocker assembly as recited in claim 3 wherein the reinforcement is further assembled to a vertical wall of the rocker outer.

13. A rocker assembly comprising:
a first rocker component and a second rocker component and a closed section reinforcement located in a hollow volume formed between the first rocker component and the second rocker component, wherein the reinforcement is assembled to the first rocker component in assembly zones located in transition zones between an upper horizontal wall and an upper flange of the first rocker component and in transition zones between a lower horizontal wall and a lower flange of the first rocker component and wherein in the transition zones, an angle α formed between the upper flange and a first part of the reinforcement extending outwards of the assembly zone is between 90° and 180°, and an angle β formed between the lower flange and a second part of the reinforcement extending outwards of the assembly zone is between 90° and 180°, wherein for any given transverse cross-section, a closed section of the reinforcement occupies a surface area at least greater than 80% of the total surface area defined by the hollow volume at the given transverse cross-section.

14. A rocker assembly comprising:
a first rocker component and a second rocker component and a closed section reinforcement located in a hollow volume formed between the first rocker component and the second rocker component, wherein the reinforcement is assembled to the first rocker component in assembly zones located in transition zones between an upper horizontal wall and an upper flange of the first rocker component and in transition zones between a lower horizontal wall and a lower flange of the first rocker component and wherein in the transition zones, an angle α formed between the upper flange and a first part of the reinforcement extending outwards of the assembly zone is between 90° and 180°, and an angle β formed between the lower flange and a second part of the reinforcement extending outwards of the assembly zone is between 90° and 180°, wherein for any given transverse cross-section, a maximum dimension of the reinforcement in the elevation direction is at least 75% of the maximum dimension in the elevation direction of the hollow volume and a maximum dimension of the reinforcement in the transverse direction is at least 75% of the maximum dimension in the transverse direction of the hollow volume.

15. An assembly process to produce the rocker assembly as recited in claim 1, the process comprising the steps of:

providing a first rocker component;

positioning a closed section reinforcement relative to the first rocker component in a pre-assembly position;

securing the reinforcement to the first rocker component by attaching the reinforcement at least in the transition zones between the upper flange and the upper horizontal wall of the first rocker component and in the transition zones between the lower flange and the lower horizontal wall of the first rocker component by (i) welding using a filler wire welding technology; or (ii) by MAG welding, or (iii) by using a discontinuous assembly joint in the form of stitches; and securing the thus assembled first rocker component and reinforcement to the second rocker component so as to form a reinforced rocker assembly.

16. The assembly process as recited in claim 15 wherein the reinforcement and the first rocker component are assembled using a filler wire welding technology.

17. The assembly process as recited in claim 15 wherein the reinforcement and the first rocker component are assembled using MAG welding.

18. The assembly process as recited in claim 15 further comprising the step of assembling a vertical wall of the first rocker component to the reinforcement, the first rocker component being a rocker inner.

19. The assembly process as recited in claim 15 further comprising the step of assembling a vertical wall of the first rocker component to the reinforcement, the first rocker component being a rocker outer.

* * * * *